United States Patent [19]

Carter

[11] 4,256,463

[45] Mar. 17, 1981

[54] PREPARATION OF ZIRCONIUM OXYCHLORIDE

[75] Inventor: Dorothy P. Carter, Albany, Oreg.

[73] Assignee: Teledyne Industries, Inc., Los Angeles, Calif.

[21] Appl. No.: 19,326

[22] Filed: Mar. 12, 1979

[51] Int. Cl.³ ............... B01D 9/00; C01F 7/34; C01G 23/02
[52] U.S. Cl. ................... 23/296; 23/305 R; 423/85; 423/82
[58] Field of Search ............ 23/296, 300, 301, 305 R; 423/475, 472, 80, 82, 85

[56] References Cited

U.S. PATENT DOCUMENTS

| 1,666,440 | 4/1928 | Coster | 423/85 |
| 3,032,388 | 5/1962 | McCord et al. | 423/85 |
| 3,057,678 | 10/1962 | Clearfield | 423/472 |
| 3,058,801 | 10/1962 | Pilloton | 423/85 |

FOREIGN PATENT DOCUMENTS 1117457 6/1968 United Kingdom ............ 423/82

Primary Examiner—William F. Smith
Assistant Examiner—Chris Konkol
Attorney, Agent, or Firm—Shoemaker and Mattare, Ltd.

[57] ABSTRACT

A method of crystallizing zirconium or hafnium oxychloride to remove metallic impurities and phosphorus by maintaining the normality of the mother liquor in which the zirconium or hafnium tetrachloride is dissolved.

4 Claims, 1 Drawing Figure

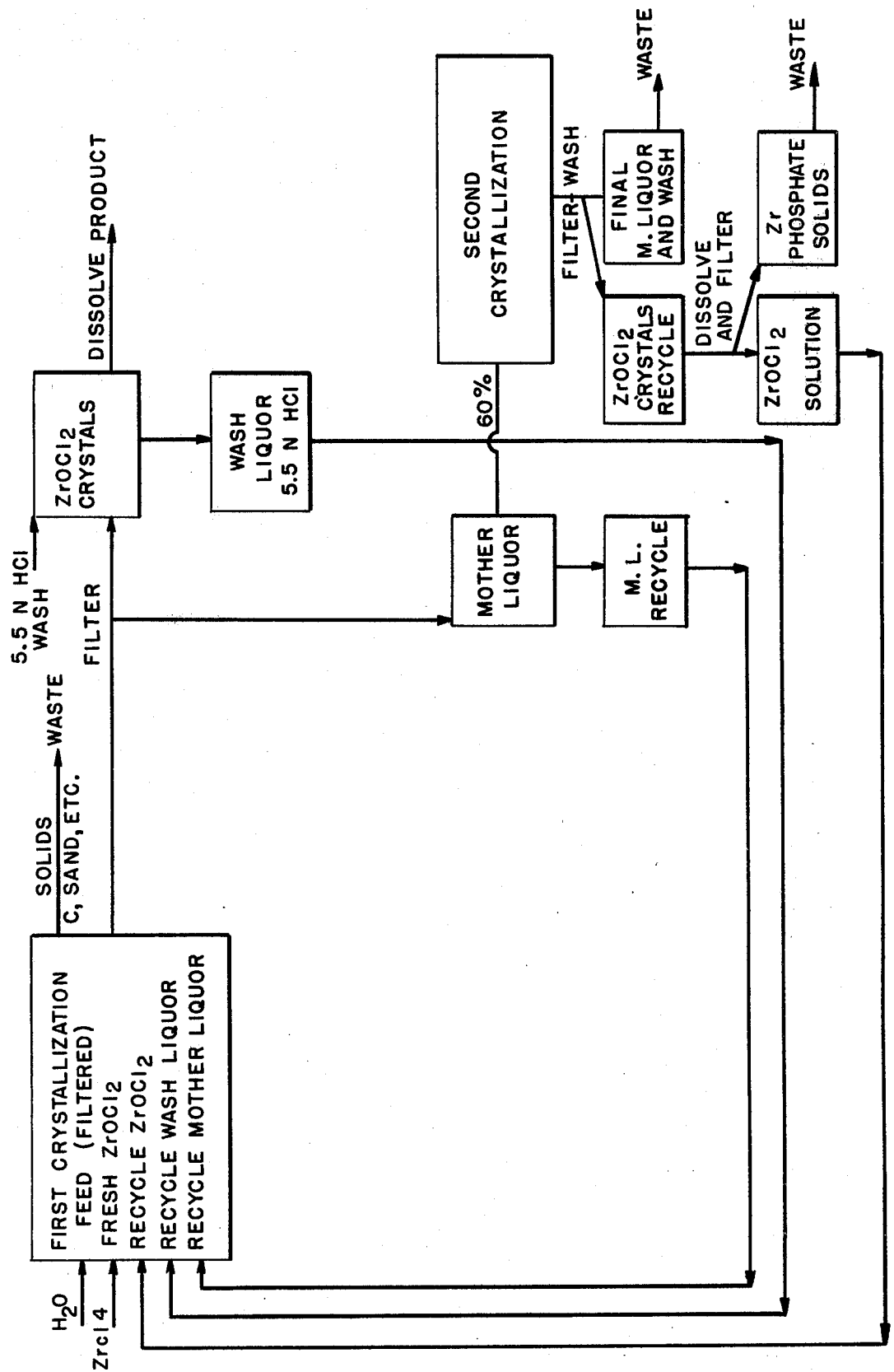

PREPARATION OF ZIRCONIUM OXYCHLORIDE

BACKGROUND OF THE INVENTION

1. Field of the Invention

The invention relates to the method of producing zirconium or hafnium oxychloride free from phosphorus and other impurities. More specifically, it deals with controlling the total acidity of the liquor in which the zirconium or hafnium tetrachloride has been dissolved.

2. Description of the Prior Art

A typical procedure for preparing zirconium oxychloride is to dissolve zirconium tetrachloride in water in proportions so as to form a hot saturated solution containing approximately 1.5 lbs. per gallon of zirconium or approximately 2 M in zirconium and having a free acid of 4–6 N and a total acid of 8 N or higher. Upon cooling, zirconium oxychloride crystals form. Zirconium oxychloride is known to have a minimum solubility in 8 N hydrochloric acid.

Zirconium oxychloride is customarily prepared in a manner so as to produce a maximum yield of crystals. These conditions of high metal concentration and a total acid of approximately 8 N are not satisfactory for phosphorus removal but are, however, adequate for removal of most impurities such as iron, titanium, etc.

As stated above, crystallization of zirconium oxychloride by the known procedures can produce a product with a low level of most impurities. If phosphorus is present in the starting material (for example, zirconium tetrachloride) in any appreciable amount (such as 1000 ppm P/Zr), it will not be significantly removed by crystallization of the zirconium oxychloride because of the formation of an insoluble zirconium phosphate compound.

This procedure of obtaining the maximum production of crystals is more well described in U.S. Pat. No. 3,032,388 issued to McCord etal wherein it can be seen that a total acidity of about 8 N is strived for.

The difference between total acidity and free acid can be best understood by referring to the formation of zirconium oxychloride from zirconium tetrachloride. The zirconium tetrachloride is dissolved in a solution of water and hydrochloric acid. In the solution the free acid is comprised of hydrochloric acid which is added to the solution plus the hydrochloric acid that forms in the reaction of zirconium tetrachloride with water to produce the zirconium oxychloride and 2 moles of hydrochloric acid for every mole of zirconium tetrachloride. The total acidity is the sum total of free acid plus the zirconium oxychloride. It is therefore evident that total acidity is much higher than the free acid.

In the McCord, etal, reference U.S. Pat. No. 3,032,388 there is mentioned various additions of 5 N hydrochloric acid and 6 N hydrochloric acid which would define part of the free acid but would also indicate that the normality of the total acidity would be considerably higher. In these high concentrations, phosphorus will not be dissolved in the mother liquor but will precipitate with the zirconium oxychloride. One can see from Table II of this patent where they have a normality of total acid of 9.24 that there is no concern for the phosphorus. Some other prior art processes for forming zirconium oxychloride are U.S. Pat No. 3,057,678 issued to Clearfield and British Pat. No. 465,605.

When phosphorus is not removed from the oxychloride, certain procedures are required at a later time in processing the metal to remove the phosphorus. This is necessary for the product metal to have satisfactory ductility and good corrosion resistance in high pressure steam.

BRIEF SUMMARY OF THE INVENTION

1. Objects of the Invention

It is, accordingly, one object of the present invention to provide a process whereby phosphorus is removed from zirconium or hafnium tetrachloride during the zirconium or hafnium oxychloride crystallization step.

An additional object of the present invention is to provide a process of removing phosphorus impurities from zirconium or hafnium oxychloride during crystallization of this compound from a mother liquor containing zirconium or hafnium oxychloride in solution by carefully controlling the total acid normality of the mother liquor.

These and other advantages will become apparent from the following detailed description and drawing.

In accordance with the above objects, it has been found that phosphorus will remain dissolved in a mother liquor in which zirconium oxychloride and hydrochloric acid are contained, if the total acid normality of the solution is maintained at below 5.75 N, preferably below 5.5 N. The normality of the mother liquor will vary depending on the phosphorus content and is inversely proportional to said control. The above is true, also for hafnium.

BRIEF DESCRIPTION OF THE DRAWING

The sole FIGURE in the present appliation shows a flow sheet diagram of the process for obtaining zirconium oxychloride crystals.

DETAILED DESCRIPTION OF THE INVENTION

In accordance with the present invention it has been found that in a process for producing zirconium oxychloride crystals from a mother liquor containing zirconium oxychloride and hydrochloric acid in water, phosphorus will remain in solution during the crystallization if the total acid normality is maintained below 5.75 N. Further, if the process is to be continuous, it is necessary to remove the zirconium oxychloride crystals about every 24 hours. Otherwise, the phosphorus will begin to precipitate out of the oxychloride crystals.

A more detailed description of the processes can be seen in the drawing wherein the following procedure relative to zirconium oxychloride is illustrated.

This invention for the preparation of zirconium oxychloride free from phosphorus is shown in the drawing wherein the sole FIGURE in the case sets forth a flow sheet and involves the following steps:

(a) Dissolution of zirconium tetrachloride in water, recycled mother liquor and dissolved recycled zirconium oxychloride to form a solution having a temperature about 75° C., not greater than 1.1 M in zirconium and having a total acid no higher than 6.0 N.

(b) Filtering the solution to remove any insoluble material and cooling to form pure zirconium oxychloride crystals and a mother liquor no higher in total acid than 5.75 N.

(c) Separation of the crystal product from the mother liquor after cooling and not later than about 24 hours after the mixture was prepared.

(d) Washing the crystals with 5.5 N hydrochloric acid.
(e) Recycling a portion (usually 40%) of the mother liquor to be used in the preparation of a new batch of crystals as soon as it is separated from the crystals.
(f) Evaporation of the remaining mother liquor to form crude zirconium oxychloride crystals.
(g) Dissolution of these crude zirconium oxychloride crystals in cold water followed by immediate filtration to remove insoluble zirconium phosphate.
(h) Recycling the clear solution of crude zirconium oxychloride from step (g) to step (a).

In accordance with the above procedure, tests were run on various batches of material having various concentrations and normalities.

TABLE I

Effect of Mother Liquor Total Acidity on P in $ZrOCl_2$ at Four Levels of P in Feed

| Feed | | | Mother Liquor | | | $ZrOCl_2$ Crystals |
|---|---|---|---|---|---|---|
| Zr g/l | P mg/l | P/Zr ppm | T.A. N | Zr g/l | P mg/l | P/Zr ppm |
| 74 | 74 | 1000 | 5.46 | 33.0 | 99 | <25 |
| | | | 6.22 | 11.3 | 90 | 415 |
| | | | 6.79 | 6.8 | 16 | 681 |
| | | | 7.60 | 6.4 | 9 | 668 |
| 110 | 110 | 1000 | 5.19 | 83.0 | 160 | 110 |
| | | | 5.45 | 28.5 | 170 | 71 |
| | | | 5.96 | 12.5 | 45 | 437 |
| | | | 6.64 | 7.3 | 19 | 543 |
| | | | 7.22 | 7.2 | 10 | 654 |
| 74 | 148 | 2000 | 5.40 | 32.0 | 320 | 29 |
| | | | 6.09 | 10.6 | 33 | 2220 |
| | | | 6.89 | 6.4 | 14 | 1655 |
| | | | 7.64 | 5.5 | 10 | 1265 |
| 110 | 220 | 2000 | 5.16 | 92.1 | 321 | 52 |
| | | | 5.36 | 31.8 | 509 | 81 |
| | | | 6.02 | 11.3 | 41 | 1450 |
| | | | 6.68 | 6.8 | 10 | 1330 |
| | | | 7.41 | 6.2 | 10 | 1825 |

TABLE II $ZrOCl_2$ Prepared from Plant Crude $ZrCl_4$

| | Feed | | | | | | M.L. | Mother Liquor | | | $ZrOCl_2$ Crystal |
|---|---|---|---|---|---|---|---|---|---|---|---|
| Run No | $ZrCl_4$ M | Zr Added | Total M | T.A. N | P/Zr ppm | P mg/l | Recycle % | T.A. N | Zr M | P mg/l | P/Zr ppm |
| 1 | 1.0 | | 0.97 | 5.70 | 365 | 32 | — | 5.25 | 0.37 | 40 | <25 |
| 2 | 1.0 | | 1.11 | 5.85 | 376 | 38 | 29.4 | 5.25 | 0.40 | 49 | <25 |
| 3 | 1.0 | | 1.11 | 6.30 | 426 | 43 | 37.4 | 5.60 | 0.23 | 58 | <25 |
| 4 | 1.0 | | 1.05 | 6.30 | 388 | 37 | 38.5 | 5.65 | 0.22 | 50 | <25 |
| 5 | 0.9 | | 1.03 | 6.10 | 491 | 46 | 40.5 | 5.50 | 0.28 | 61 | <25 |
| 6 | 0.9 | | 0.99 | 6.00 | 571 | 52 | 39.5 | 5.40 | 0.33 | 67 | <25 |
| 7 | 0.9 | | 0.97 | 6.10 | 1460 | 130 | 37.2 | 5.25 | 0.41 | 163 | <25 |
| 8 | 0.9 | | 1.05 | 5.75 | 1710 | 163 | 36.9 | 5.30 | 0.42 | 209 | <25 |
| 9 | 0.9 | | 0.99 | 5.65 | 1810 | 163 | 37.8 | 5.15 | 0.52 | 198 | <25 |
| 10 | 1.0 | | 1.13 | 6.00 | 1540 | 159 | 35.8 | 5.45 | 0.36 | 261 | 40 |
| 11 | 1.0 | | 0.99 | 5.90 | 2620 | 237 | 47.5 | 5.40 | 0.38 | 308 | 35 |
| 12 | 1.0 | | 1.08 | 6.00 | 2190 | 215 | 37.7 | 5.55 | 0.29 | 285 | 66 |
| 13 | 1.0 | | 1.03 | 6.15 | 2260 | 212 | 44.4 | 5.75 | 0.21 | 93 | 2000 |
| 14 | 1.0 | | 1.01 | 5.90 | 1590 | 147 | 42.6 | 5.50 | 0.30 | 192 | <25 |
| 15 | 1.0 | | 0.99 | 5.80 | 1650 | 149 | 37.9 | 5.35 | 0.42 | 191 | <25 |
| 16 | 1.0 | | 1.04 | 5.85 | 1660 | | 37.2 | 5.30 | 0.40 | | <25 |

Tables I and II summarize the results of two typical experiments showing the effect of total acid on phosphorus removal. The first experiment included batch tests at various acidities and two levels of phosphorus. The second experiment was a recycle test where a portion of the mother liquor was recycled each day in the preparation of a new batch of crystals. The effect of total acid is apparent in the P/Zr analysis of the product crystals. This criticality is particularly evident in Table II where it can be seen that a total acidity of the mother liquor at 5.65 N (Example 4) had good results, whereas Example 13 having a total acidity of 5.75 N, most of the phosphorus appears to have been precipitated out of solution.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the mete and bounds of the claims or that form their functional as well as conjointly cooperative equivalent are, therefore, intended to be embraced by those claims.

As, for instance, the same process illustrated by the production of zirconium oxychloride can be used for purification of hafnium oxychloride.

What is claimed is:

1. In a method of producing the oxychloride of a metal selected from the group consisting of zirconium and hafnium by dissolving zirconium tetrachloride or hafnium tetrachloride in water and mother liquor from a previous crystallization and subsequently crystallizing from the newly formed mother liquor, the improvement comprising producing said oxychloride relatively free from phosphorus by maintaining the total acidity of the newly formed mother liquor below about 5.75 N during crystallization.

2. The method of claim 1, wherein the normality of the mother liquor is maintained below about 5.5 N.

3. The method of claim 1, wherein the mother liquor is made from a feed which is no more than 1.1 Molar in zirconium.

4. The method of claim 1 wherein the mother liquor is made from a feed which is no more than 1.1 Molar in hafnium.

* * * * *